United States Patent [19]

Nakamura et al.

[11] Patent Number: 4,851,924
[45] Date of Patent: Jul. 25, 1989

[54] COLOR RECORDER OVERHEAD PROJECTOR WITH COLOR RECORDER

[75] Inventors: Takuma Nakamura, Tokyo; Yasuhiko Saka, Yamato, both of Japan

[73] Assignee: Ricoh Company, Ltd., Tokyo, Japan

[21] Appl. No.: 220,171

[22] Filed: Jul. 18, 1988

[30] Foreign Application Priority Data

Jul. 18, 1987 [JP] Japan ................................ 62-179746

[51] Int. Cl.$^4$ ...................... H04N 1/23; G01D 15/10; G03B 21/00
[52] U.S. Cl. ............................... 358/296; 346/76 PH; 353/DIG. 3; 353/122; 353/53
[58] Field of Search .......................... 346/108, 76 PH; 400/120; 358/296; 343/DIG. 3, 122, 53

[56] References Cited

U.S. PATENT DOCUMENTS

| | | | |
|---|---|---|---|
| 4,346,449 | 8/1982 | Ovshinsky | 346/76 PH |
| 4,607,291 | 8/1986 | Oono | 358/296 |
| 4,609,779 | 9/1986 | Rogers | 358/296 |
| 4,811,110 | 3/1989 | Ohmura | 358/296 |

Primary Examiner—E. A. Goldberg
Assistant Examiner—Scott A. Rogers
Attorney, Agent, or Firm—Oblon, Spivak, McClelland, Maier & Neustadt

[57] ABSTRACT

An overhead projector having scanning device for scanning an original image thereby generating electric signals corresponding to the original image, selecting device for selecting one of a thermochromic film and a thermographic paper, a first heating device for heating the film thereby erasing an image formed formerly in the film, a second heating device for heating the film in accordance with the electric signals transmitted from the scanning device to form an image corresponding to the original image in the film when the film is selected by the selecting device and for jheating the thermographic paper in accordance with the electric signals transmitted from the scanning device to print an image corresponding to the original image in the thermographic paper when the thermographic paper is selected by the selecting device, and projecting device for projecting the image formed in the film on a given screen.

9 Claims, 7 Drawing Sheets $T_1 = a(R_T /\!/ R_1) C_1$ $T_2 = a(R_T /\!/ R_2)(C_1 + C_2)$

COLOR RECORDER OVERHEAD PROJECTOR WITH COLOR RECORDER

BACKGROUND OF THE INVENTION

This invention relates to a color overhead projector which reads an image from a color original, writes the image into a film and illuminates the film to project the image on a screen.

The inventors formerly proposed an overhead projector capable of writing into a thermochromic film an image read out from an original, illuminating the film to project the image on a screen (Japanese Patent Application No. 61(1986)-309,334).

The thermochromic film possesses such a property that it becomes transparent on being heated to a first temperature, for example, about 60° C. and retains its transparence even after being cooled to normal room temperature, becomes opaque on being heated to a second temperature, for example, 72° C., and retains its opacity even after being cooled to normal temperature. When the film on which an image has been already formed is exposed uniformly to the first temperature (transparentizing temperature), therefor, the image is erased. When the film which has been transparentized to erase the old image is exposed selectively to the second temperature in conformity with an original image, a new image is formed on it. Owing to this peculiar property, the same thermochromic film can be used repeatedly. The projector of the aforementioned proposal (Japanese Patent Application No. 61(1986)-309,334) is capable of recording the image read out from an original, namely printing the image on a thermographic recording paper with a thermal head, besides writing the image in the thermochromic film with the same thermal head. The projector of the aforementioned proposal is so constructed that the thermal head is switched between the thermochromic film side and the thermographic paper side. The proper pressure of the thermal head to be exerted on the thermochromic film is in the range of 200 to 400 g/cm$^2$ and that to be exerted on the thermographic paper is in the range of 3 to 5 kg/cm$^2$.

In the projector of the aforementioned proposal, however, the pressure of the thermal head which is produced by a head pressing means is constant and cannot be changed to be suitable for the case where the thermal head is used on the thermochromic film and the case where it is used on the thermographic recording paper. Therefore it is difficult for the projector to produce clear images on both the thermochromic film and the thermographic recording paper equally.

The thermochromic film is produced by forming a thermochromic layer on one surface of a base film of polyester, for example. The thermochromic layer softens when the thermochromic film is heated over the state transition temperature (that is, softening temperature). Therefore, in the device of the aforementioned proposal which is so constructed that the thermochromic layer, for the erasure of an old image, is heated by being pressed against a heat roller, the softening of the thermochromic layer entails the disadvantages that the film suffers flaws and impressions on its surface by the heat roller, and the roller is smeared with the softened thermochromic layer. The quality of the image on the screen produced by the device therefore, is very inferior due to above described disadvantages. Further, when the thermochromic layer which has been heated to the transparentizing temperature is suddenly cooled by contact with a conveying roller, for example, before it is cooled naturally to a temperature below the softening point, it opacifies to such an extent that erasing the old image becomes practically impossible.

SUMMARY OF THE INVENTION

This invention has been initiated to eliminate the various drawbacks of the prior art described above.

An object of this invention is to provide an overhead projector which is capable of recording clear images on both the thermochromic film and the thermographic recording paper.

Another object of this invention is to provide an overhead projector which is capable of erasing an old image from the thermochromic film without inflicting any flaws or any impressions by the heat roller used for erasing the image nor causing the film to opacifies.

The object of this invention described above is accomplished by overhead projector comprising:

scanning means for scanning an original image thereby generating electric signals corresponding to said original image;

selecting means for selecting one of a film capable of being transparent on being heated to a first temperature, keeping transparent even after being cooled to normal room temperature, being opaque on being heated to a second temperature higher than said first temperature and keeping opaque even after being cooled to normal room temperature, and a thermographic paper capable of coloring, on being heated to a third temperature;

first heating means for heating said film to said first temperature thereby erasing an image formed formerly in said film;

second heating means adapted to press said film with a first pressing force and heat said film to said second temperature in accordance with said electric signals transmitted from said scanning means to form an image corresponding to said original image in said film when said film is selected by said selecting means and adapted to press said thermographic paper with a second pressing force and heat said thermographic paper to said third temperature in accordance with said electric signals transmitted from said scanning means to print an image corresponding to said original image in said thermographic paper when said thermographic paper is selected by said selecting means; and projecting means for projecting said image formed in said film on a given screen.

The another object of this invention is accomplished by an overhead projector comprising:

scanning means for scanning an original image thereby generating electric signals corresponding to said original image;

a film capable of being transparent on being heated to a first temperature, keeping transparent even after being cooled to normal room temperature, being opaque on being heated to a second temperature higher than said first temperature and keeping opaque even after being cooled to normal room temperature, said film being composed of a film base capable of retaining stiffness thereof up to said first temperature and a thermochromic layer formed on one surface of said film base;

first heating means adapted to contact said film base of said film and heat said film to said first temperature so as to erase an image formerly formed in said film;

second heating means adapted to contact said thermochromic layer of said film and heat said film to said second temperature in accordance with said electric signals transmitted from said scanning means in order to form an image corresponding to said original image in said film; and projecting means for projecting said image formed in said film on a given screen.

The aforementioned and other characteristics and advantages of the present invention will become apparent from the following description of preferred embodiments of this invention illustrated in the accompanying drawings.

BRIEF DESCRIPTION OF THE DRAWINGS

FIG. 10 (b) is a diagram illustrating the construction of the thermochromic film.

DETAILED DESCRIPTION OF THE PREFERRED EMBODIMENTS

Figure 1:
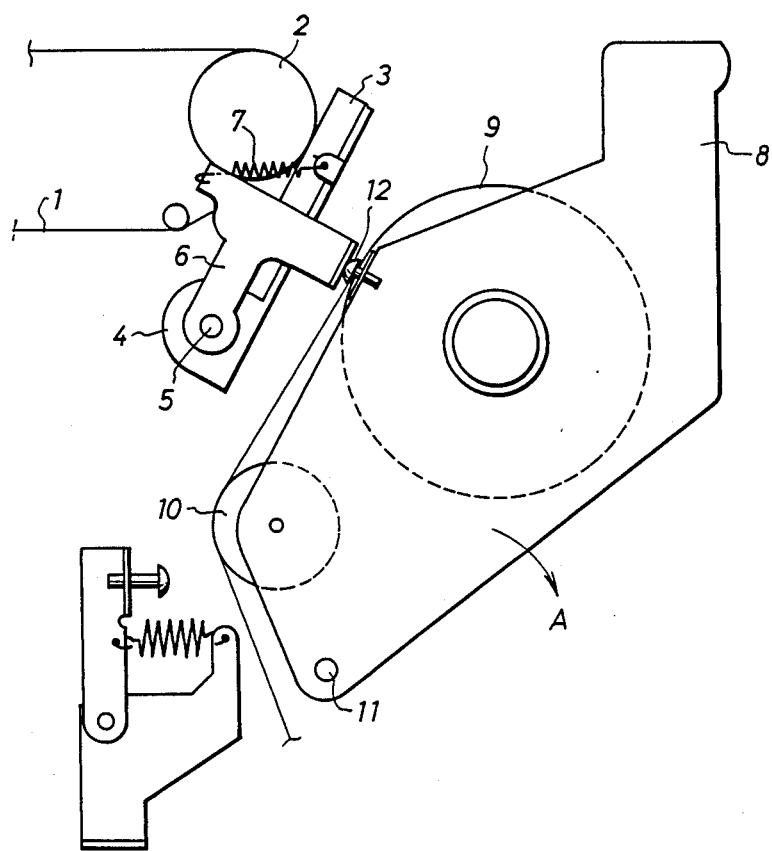
FIG. 1 and FIG. 2 are diagrams illustrating the construction of an overhead projector as the first embodiment of this invention and the states of a thermal head of the overhead projector when the formation of an image is effected on a thermochromic film and when it is effected on a thermographic recording paper.

Now, the first embodiment of this invention will be described in detail below with reference to FIG. 1 through FIG. 7. FIG. 1 shows the state in which a thermal head 3 is held in contact with a thermochromic film 1 and FIG. 2 the state in which the thermal head 3 is held in contact with a thermographic recording paper 9a.

As illustrated in FIG. 1, the thermochromic film 1 is tightened by platen rollers 2. The thermal head 3 is held with a bracket 4 which is adapted to freely rotate around a shaft 5. A member 6 similar to the bracket 4 is rotatable around the shaft 5 and is joined to the bracket 4 through a spring 7 adapted to urge the thermal head 3 toward the film. A frame 8 is adapted to retain a thermographic paper roll 9 and a platen roller 10 for the thermographic paper and is rotatable around a shaft 11 in the direction of the arrow A. An adjusting screw 12 is fitted to the frame 8 and is adapted to abut the member 6 to adjust the pressing force of the head 3 exerted on the platen roller 2.

During the formation of an image in the thermochromic film 1, the member 6 is prevented from rotating around the shaft 5 by the screw 12 to keep the bracket 4 pulled through the spring 7. As the result, the thermal head 3 is pressed against the thermochromic film 1 which is tightened by the platen roller 2 in accordance with the urging force of the spring 7 as illustrated in FIG. 1. The pressing force can be adjusted with the height of the adjusting screw 12 from the surface of the frame 8.

Figure 2:
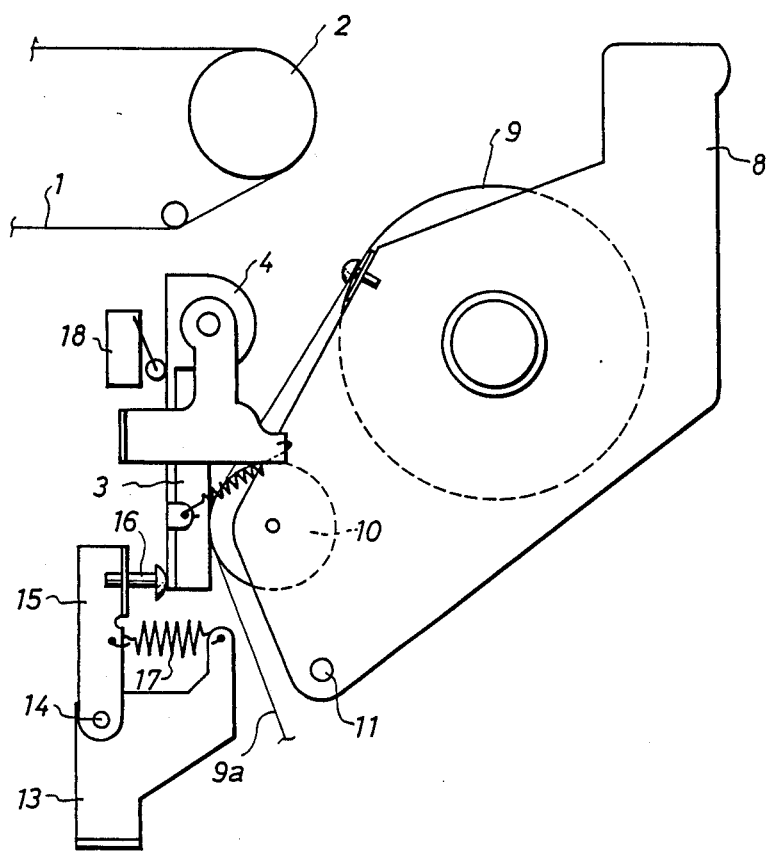

For the preparation of the formation of an image in the thermographic paper, the frame 8 is turned in the direction A, the bracket 4 is turned downwardly around the shaft 5, and the frame 8 is returned to the original position. As illustrated in FIG. 2, a stationary member 13 fixed to the projector is disposed below the head 3. This stationary member 13 is provided at one end thereof with a rotatable shaft 14 and at the other end thereof with an arm 15 to which a head pressure adjusting screw 16 is fitted. A spring 17 pulls the arm 15 to push the thermal head through the adjusting screw 16, against the thermographic paper 9a drawn from the thermographic paper roll 9 via the platen roller 10 as illustrated in FIG. 2. The pressing force can be adjusted with the height of the adjusting screw 16 from the surface of the arm 15. A switch 18 is disposed for the purpose of detecting the head position.

Owing to the construction described above, the thermal head 3 is urged with suitable magnitudes of pressing force toward the thermochromic film by the spring 7 and toward the thermographic paper by the spring 17 respectively.

Figure 3:
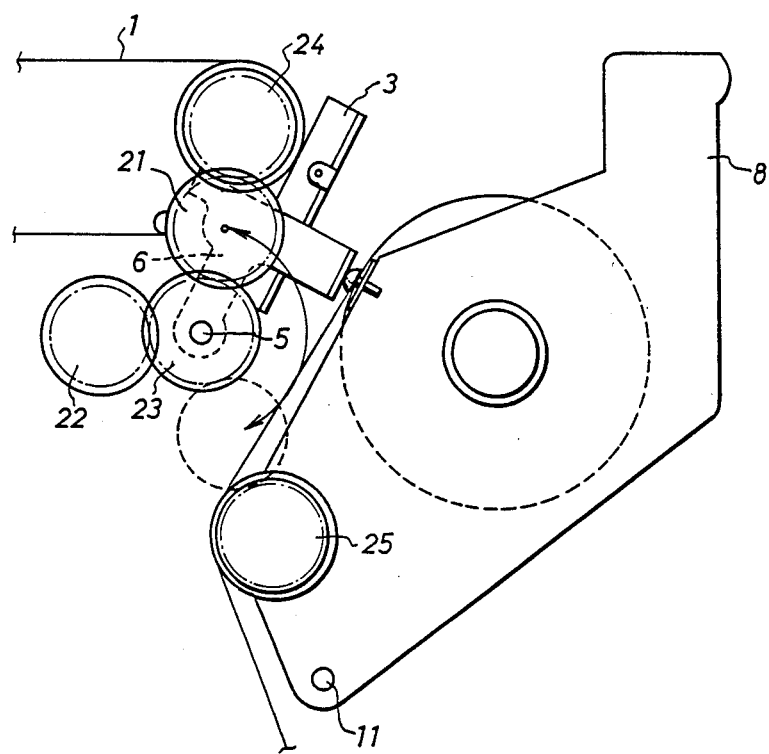
FIG. 3 is a diagram illustrating a drive unit for transmitting driving force to a platen roller.

FIG. 3 illustrates a driving unit for driving the platen roller 10. The member 6 is provided with a relay gear 21. This relay gear 21 is moved as the thermal head 3 is switched to the thermochromic film side or to the thermographic paper side. A transmission gear 23 is fitted on the shaft 5. For writing the image in the thermochromic film 1, drive means (not shown) rotates the platen gear 24 through a drive gear 22, the transmission gear 23, and the relay gear 21. On the other hand, for printing the image in the thermographic paper, the drive means rotates the other platen gear 25 through the drive gear 22, the transmission gear 23, and the relay gear 21.

The temperature of the heating element of the thermal head 3 suitable for writing the image in the thermochromic film 1 and that suitable for printing the image in the thermographic paper 9a are generally different. The temperature of the heating element, therefore, must be switched at the same time as the position of the head is switched.

Though the temperature of the heating element may be controlled by changing the voltage applied to the heating element, the present embodiment adopts the method of changing the width of the electric pulses supplied to the heating element.

Figure 4:
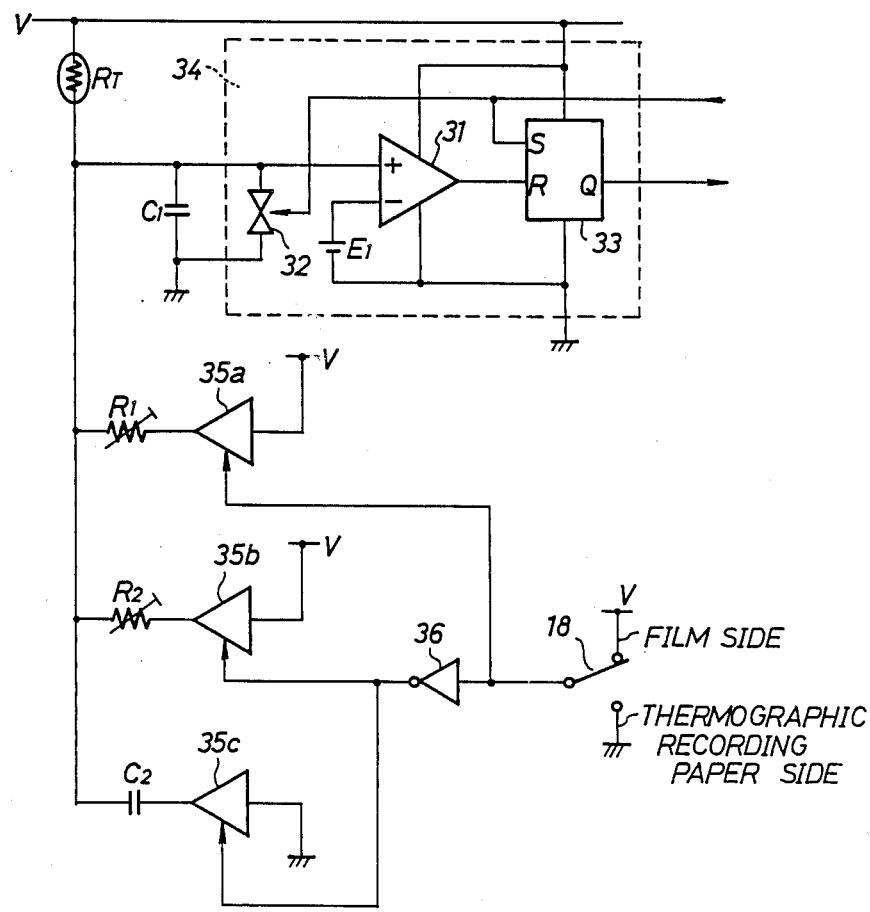
FIG. 4 is a constitutional diagram of a control circuit for heating elements in the thermal head.

FIG. 4 shows the control circuit. The pulse width is controlled by a monostable multivibrator 34 which comprises a comparator 31 provided with a standard voltage $E_1$, an analog switch 32, and an R-S flipflop 33. A switch 18 for detecting the head position generates a digital signal of high level "H" when the head 3 is on the thermochromic film side and a digital signal of low level "L" when the head 3 is on the thermographic paper side, which are used to drive time constant switching tristate buffers 35a, 35b, and 35c.

Figure 5A:
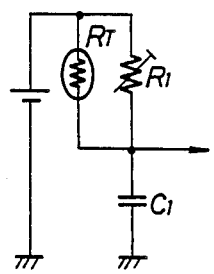
FIG. 5 and FIG. 6 are explanatory diagrams regarding the operation of the control circuit.
Figure 5B:
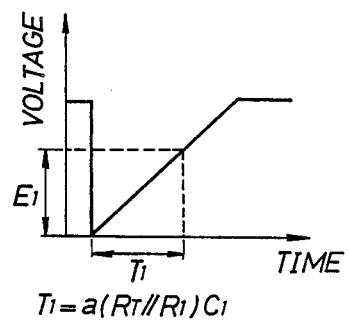
Figure 6A:
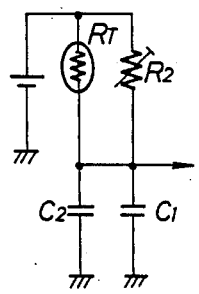
Figure 6B:
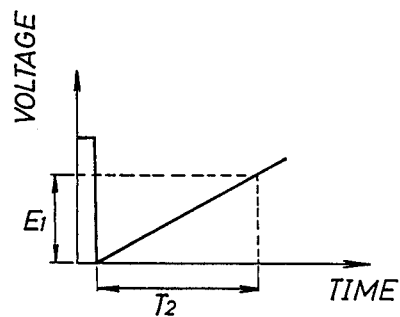

When the level of the signal of the switch 18 is "H", the buffer 35a produces an output "H" and causes a capacitor $C_1$ to be charged through a variable resistor $R_1$ and a thermistor $R_T$. The thermistor $R_T$ is provided for detecting the temperature of the thermal head as illustrated in FIG. 5 (a). In this case, the time constant $T_1$ of the monostable multivibrator 34 is as follows.

$$T_1 = a(R_T \| R_1)C_1$$

When the level of the signal of the switch 18 is "L", the output of the buffer 35a is in the open state and the variable resistor $R_1$ becomes irrelevant to the time constant. Instead, the buffer 35b produces an output of "H" and the buffer 35c produces an output of "L", through the output of an inverter 36. In this case, the time constant $T_2$ is calculated by the following formula by referring to an equivalent circuit illustrated in FIG. 6.

$$T_2 = a(R_T \| R_2)(C_1 + C_2)$$

Thus, the width of the electric pulses applied to the heating element of the thermal head is automatically changed as the thermal head is switched between the thermochromic film side and the thermographic paper side.

Figure 7:
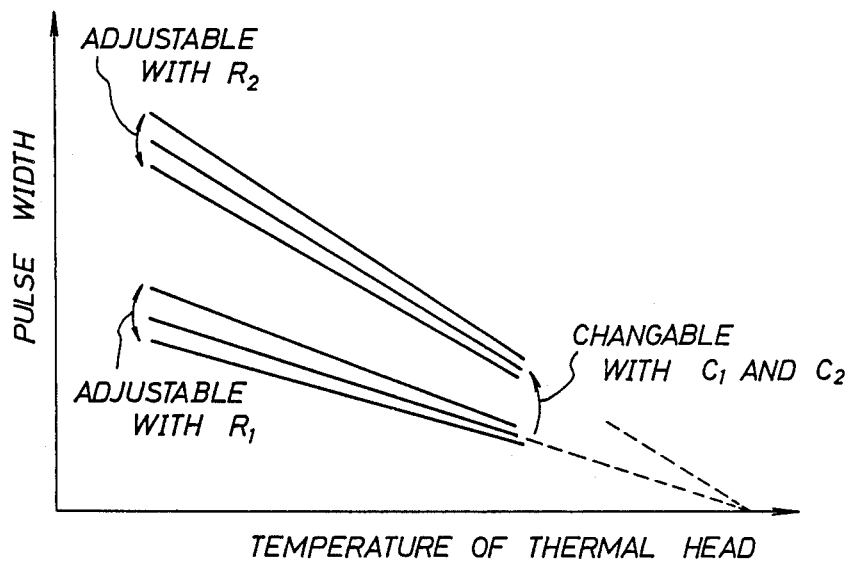
FIG. 7 is a diagram for the explanation of the function of a thermistor to be fitted to the thermal head.

The thermistor $R_T$ possesses the function of decreasing the pulse width proportionately to the rise of the temperature of the thermal head as illustrated in FIG. 7 to contribute to keeping the temperature of the heating element constant.

Now, the second embodiment of this invention will be described below with reference to FIG. 8 to FIG. 10.

First, the temperature characteristic of the thermochromic film used in the present invention will be described.

Figure 8:
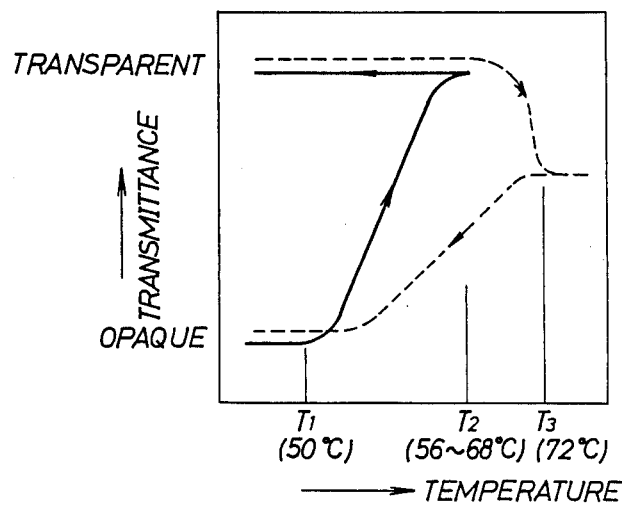
FIG. 8 is a temperature characteristic diagram of the thermochromic film.

As illustrated in FIG. 8, the thermochromic film becomes optically transparent on being heated to a temperature $T_2$ (56° to 68° C.) and keeps transparent even after being cooled to normal room temperature. Also it becomes opaque on being heated to a temperature $T_3$ (in the neighborhood of 72° C.) and keeps opaque even after being cooled to normal room temperature. When the film on which an image has been already formed is heated to the temperature $T_2$ (transparentizing temperature), therefore, the image is erased. On the film which has been transparentized to erase the old image, a new image can be formed by selectively heating the film to the temperature $T_3$ (opacifying temperature) in conformity with the signal transmitted from the image sensor. At a temperature $T_1$ (in the neighborhood of 50° C.), the film undergoes change of state (softening).

Now, the construction of the present embodiment will be described.

Figure 9:
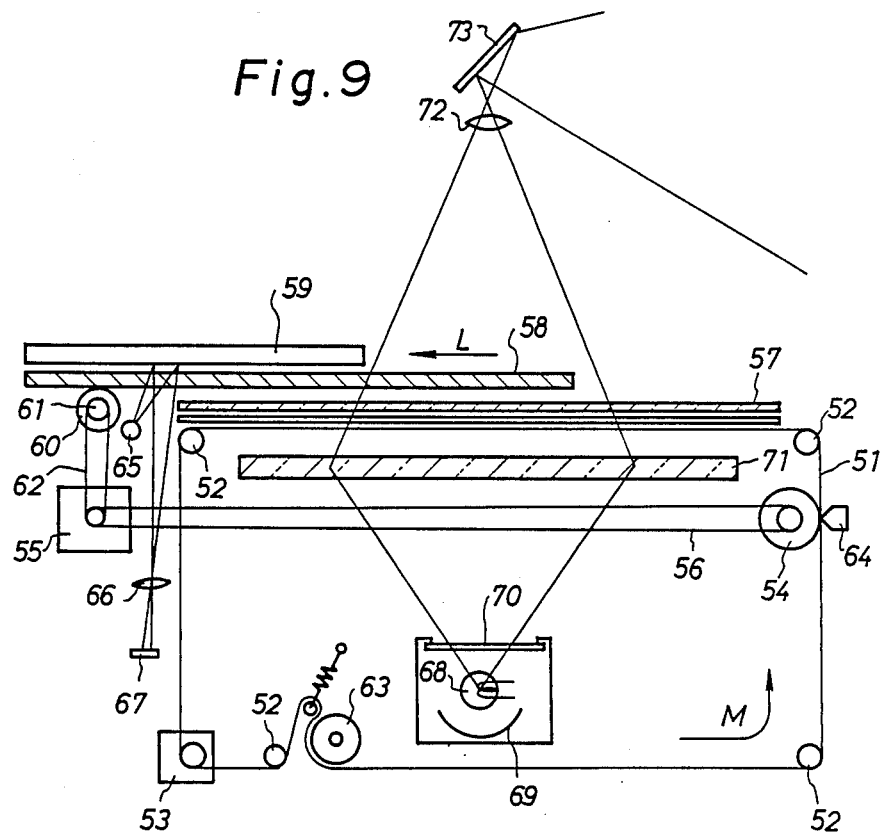
FIG. 9 is a constitutional diagram illustrating an overhead projector as the second embodiment of this invention.
Figure 10A:
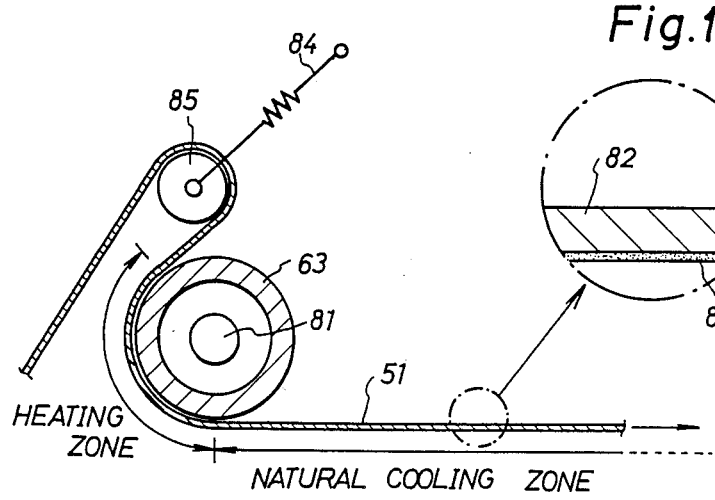
FIG. 10 (a) is a diagram showing the relation between the erasing heat roller and the thermochromic film.
Figure 10B:
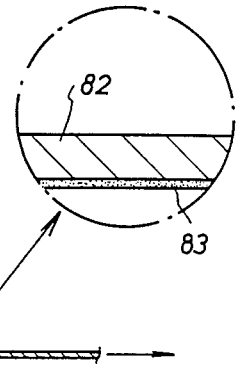

As illustrated in FIG. 9, a thermochromic film 51 is tightened by platen rollers 52 and an auxiliary feed device 53, and is driven by a drive unit 55 comprising a motor and a speed reducer through a belt 56 and a feed roller 54.

An original 59 is laid on an original stand 58 and is moved by a feed roller 60. A protective glass 57 is disposed for the protection of the film 51. The feed roller 60 is provided with a built-in clutch 61 and is driven by the drive unit 55 through the belt 62.

An erasing heat roller 63 is adapted to heat the thermochromic film 51 to the transparentizing temperature to erase the image formed on the film as the film is conveyed.

The light from an original illuminating light source 65 is irradiated to the surface of the original laid on the original stand 58. The light reflected on this surface is led through a lens 66 to an image sensor 67 comprised of a photoelectric conversion element such as CCD. The original image, therefore, can be read out with the movement of the original stand 58.

A thermal head 64 forms an image in the film by selectively heating the surface of the film to the opacifying temperature in conformity with the signal transmitted from the sensor 57.

A projecting lamp 68, a converging reflection mirror, a heatproof glass 70 for absorbing infrared ray, a Fresnel lens 71, a projecting lens 72, and a reflection mirror 73 are provided for projecting the image formed on the film 51 on a given screen.

Now, the operation of the present embodiment will be described. First, the original stand 58 on which the original 59 to be projected is laid is manually set at the read position. Then the drive unit 55 is started for the feed roller 60 to move the original stand 58 in the direction of the arrow L and for the image sensor 67 to read the original 59. At the same time, the feed roller 54 starts to rotate to circulate the endless thermochromic film 51 in the direction of the arrow M, and the thermal head 64 immediately starts to write the image which has been read out by the image sensor 67 into the thermochromic film 51. Preparatory to this writing, unnecessary image formed formerly on the thermochromic film 51 is erased with the erasing heat roller 63. In this manner, the reading of the image from the original 59 and the writing of the read image into the thermochromic film 51 are carried out simultaneously. When the writing is completed, the film 51 is forwarded until the image formed in the film reaches the position for projection. Then, the projecting lamp 68 is put on to project the image on the screen.

Now, the simultaneous operation of the reading by the image sensor 67 and the writing by the thermal head 64 will be described in more detail below. First, the image sensor 67 reads one full line of the image by main scanning, generates electric signals corresponding thereto, and forward the electric signals to the thermal head 64. The thermal head 64, in accordance with the electric signals, writes the one full line of the image into the thermochromic film 51. Then, the original stand 58 and the thermochromic film 51 are advanced by an interval equivalent to the one full line of the image to be ready for the reading and the writing of the next one full line of the image. The above described reading and writing operation is repeated for each of the successive lines of the image.

Now, the erasing heat roller 63 which is one of the characteristic components of the overhead projector of this invention will be described below. In the present embodiment, the erasing heat roller 63 provided with a halogen heater 81 in the central part thereof as illustrated in FIG. 10 (a) heats the thermochromic film 51 to the transparentizing temperature to erase the image. As illustrated in magnified form in FIG. 10 (b), the thermochromic film comprises a base film 82 and a thermochromic layer 83. The erasing heat roller 63 is disposed so as to contact the base film 82. As the base film 82, it is easy to obtain such a material for example, a polyester film as is capable of retaining surface stiffness up to 70° C.

For heating the thermochromic film uniformly, the film must be pressed with proper pressure against the heat roller 63 to ensure efficient conduction of heat. For this purpose, a tension roller 85 kept drawn with a spring 84 is disposed on the upstream of the heat roller 63 with respect to the direction of film conveyance. Owing to this arrangement, the distance of the heating zone is increased as illustrated in FIG. 10 (a).

Besides that, the film is pressed against the heat roller 63 with the constant pressure even though the film is expanded by the heat applied, since the tension roller 85 absorbs the expansion of the film.

Further, a natural cooling zone is provided in the overhead projector for preventing the thermochromic film 51 which has been heated to the transparentizing temperature by the heat roller 63 from touching other components disposed nearby until the hot film is cooled to below the softening temperature.

The thermochromic layer 83 has no possibility of sustaining any flaws or impressions of the heat roller 63 because the thermochromic layer 83 heated to the transparentizing temperature and consequently softened does not contact the heat roller 63 nor other components owing to the construction described above. Accordingly, it also has no possibility of being opacified because it is not suddenly cooled. Although the tension roller 85 contacts the thermochromic layer 83, there arises no problem because, at the time of this contact, the temperature of the film is below the softening point.

In the present embodiment, a heat roller adapted to rotate simultaneously with the advance of the thermochromic film is employed as means for applying the transparentizing temperature. Optionally, there may be employed instead a stationary erasing heater which is so adapted that the film slides over the surface of the heater.

Although the present invention has been described with reference to preferred embodiments, it is to be understood that various changes and modifications may be made therein by those skilled in the art without departing from the spirit and scope of the invention as defined in the appended claims.

What is claimed is:

1. An overhead projector comprising:
   scanning means for scanning an original image thereby generating electric signals corresponding to said original image;
   selecting means for selecting one of a film capable of being transparent on being heated to a first temperature, keeping transparent even after being cooled to normal room temperature, being opaque on being heated to a second temperature higher than said first temperature and keeping opaque even after being cooled to normal room temperature, and a thermographic paper capable of coloring on being heated to a third temperature;
   first heating means for heating said film to said first temperature thereby erasing an image formed formerly in said film;
   second heating means adapted to press said film with a first pressing force and heat said film to said second temperature in accordance with said electric signals transmitted from said scanning means to form an image corresponding to said original image in said film when said film is selected by said selecting means and adapted to press said thermographic paper with a second pressing force and heat said thermographic paper to said third temperature in accordance with said electric signals transmitted from said scanning means to print an image corresponding to said original image in said thermographic paper when said thermographic paper is selected by said selecting means; and
   projecting means for projecting said image formed in said film on a given screen.

2. An overhead projector according to claim 1, wherein said film comprises a film base of polyester and a thermochromic layer formed on one surface of said film base.

3. An overhead projector according to claim 1, wherein said first pressing force is in the range of 200 to 400 g/cm$^2$ and said second pressing force is in the range of 3 to 5 kg/cm$^2$.

4. An overhead projector according to claim 1, wherein said first temperature is approximately 60° C. and said second temperature is approximately 72° C.

5. An overhead projector according to claim 1, wherein said second heating means is adapted to control temperature of a heating element thereof by changing a width of an electric pulse applied to the heating element.

6. An overhead projector comprising:
   scanning means for scanning an original image thereby generating electric signals corresponding to said original image;
   a film capable of being transparent on being heated to a first temperature, keeping transparent even after being cooled to normal room temperature, being opaque on being heated to a second temperature higher than said first temperature and keeping opaque even after being cooled to normal room temperature, said film being composed of a film base capable of retaining stiffness thereof up to said first temperature and a thermochromic layer formed on one surface of said film base;
   first heating means adapted to contact said film base of said film and heat said film to said first temperature so as to erase an image formerly formed in said film;
   second heating means adapted to contact said thermochromic layer of said film and heat said film to said second temperature in accordance with said electric signals transmitted from said scanning means in order to form an image corresponding to said original image in said film; and
   projecting means for projecting said image formed in said film on a given screen.

7. An overhead projector according to claim 6, wherein said first heating means is provided with means for retaining tension of said film at a fixed magnitude.

8. An overhead projector according to claim 6, wherein said first heating means is so adapted that said film being heated to said first temperature and consequently softened is cooled naturally until said film stiffness.

9. An overhead projector according to claim 6, wherein said first temperature is approximately 60° C. and said second temperature is approximately 72° C.

* * * * *